United States Patent [19]

Hattendorf

[11] 4,062,248
[45] Dec. 13, 1977

[54] TWO-SPEED VIDEO RECORDER

[76] Inventor: Henry John Hattendorf, 262 Santa Paula, Grand Prairie, Tex. 75050

[21] Appl. No.: 728,114

[22] Filed: Sept. 30, 1976

Related U.S. Application Data

[63] Continuation-in-part of Ser. No. 676,111, April 12, 1976.

[51] Int. Cl.$^2$ .......................... F16H 9/00; F16H 15/00
[52] U.S. Cl. ...................................... 74/217 R; 74/190
[58] Field of Search .................... 74/217, 242.4, 190.5, 74/190

[56] References Cited

U.S. PATENT DOCUMENTS

| | | | |
|---|---|---|---|
| 2,875,623 | 3/1959 | Babler | 74/190 |
| 3,481,214 | 12/1969 | Warren | 74/217 R |
| 4,009,950 | 3/1977 | Suzaki et al. | 74/217 R X |

Primary Examiner—Leonard H. Gerin
Attorney, Agent, or Firm—Richards, Harris & Medlock

[57] ABSTRACT

The specification discloses a video recorder having two recording speeds. The recorder includes a capstan pulley for moving video tape past a recording head and a drive pulley rotated at a predetermined drive speed. A speed change assembly is interconnected between the drive and capstan pulleys and is operable to selectively change the recording speed of the video tape recorder. The speed change assembly includes a first shaft including first and second pulleys. A second shaft is provided and includes a first and second pulley, the first pulley of the second shaft having a smaller diameter than the first pulley of the first shaft. A solenoid is provided to move the first and second shafts between a first and second position, such that in the first position the first pulley of the first shaft engages the drive pulley and the second pulley of the second shaft engages the capstan pulley. In the second position, the first pulley of the second shaft engages the drive pulley and the second pulley of the first shaft engages the capstan pulley.

15 Claims, 10 Drawing Figures

TWO-SPEED VIDEO RECORDER

RELATED APPLICATIONS

This application is a continuation-in-part of copending application Ser. No. 676,111 filed Apr. 12, 1976 and entitled "Two-Speed Video Recorder."

FIELD OF THE INVENTION

This invention relates to video recorders, and more particularly relates to a video recorder having multiple recording speeds.

THE PRIOR ART

Video recorders which use magnetic tape cassettes are well known. In such recorders, a magnetic tape is moved past recording and playback heads by capstan drive. The capstan drive is rotated through a pulley and belt drive which is rotated by a drive motor. Previously developed video cassette recorders operate at a single recording speed and are generally limited to one hour of recording on a single tape cassette. Additional recording time is then limited by the length of tape which can be accommodated by a machine. A need has thus arisen for a video recorder which can record for various time intervals and which can provide extended recording time.

SUMMARY OF THE INVENTION

In accordance with the present invention, an apparatus is provided for changing the recording speed of a video tape recorder having drive and capstan pulleys. A speed change assembly is interconnected between the drive and capstan pulleys and is operable to selectively change the recording speed of the video tape recorder. The speed change assembly includes a first shaft including first and second pulleys. A second shaft is provided and includes first and second pulleys, which are aligned with the first and second pulleys of the first shaft. Structure is provided for selectively moving the shafts between a first and second position, such that in the first position, the first pulley of the first shaft engages the drive pulley and the second pulley of the second shaft engages the capstan pulley. In the second position, the first pulley of the second shaft engages the drive pulley and the second pulley of the first shaft engages the capstan pulley in order to change the recording speed of the video tape recorder.

In accordance with a more specific aspect of the invention, a speed change assembly is interconnected between the drive and capstan pulleys of a video recorder and includes a housing selectively rotatable to change the recording speed of the video tape recorder. The housing includes first and second shafts, which are rotatable between a first and second position. A solenoid having an armature is mounted to the housing. Structure connects the solenoid with the first and second shafts to transform the rectilinear motion of the solenoid armature to circular motion for causing rotation of the shafts between the first and second positions to thereby change the recording speed of the video tape recorder.

DESCRIPTION OF THE DRAWINGS

For a more detailed explanation of the present invention and for further objects and advantages thereof, reference is now made to the following detailed description taken in conjunction with the accompanying drawings, in which.

DESCRIPTION OF THE PREFERRED EMBODIMENT

Figure 1:
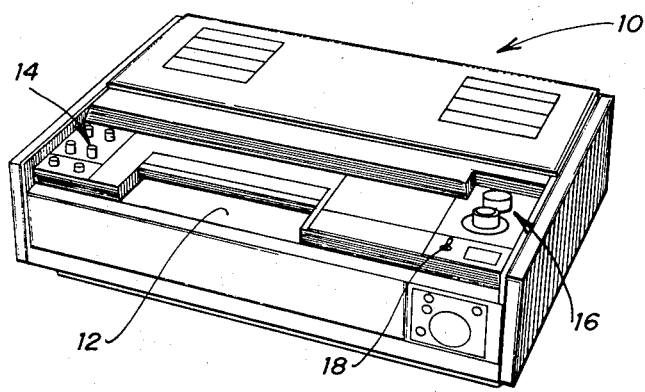
FIG. 1 is a perspective view of a typical video cassette recorder utilizing the present invention.

FIG. 1 illustrates a typical video cassette recorder embodying the present invention. A recorder is identified generally by the numeral 10 and may comprise for example a conventional color video cassette recorder such as the model CR-6300 recorder manufactured and sold by JVC Industries, Inc. of Maspeth, N.Y. The recorder includes a magnetic tape cassette holder 12 which receives the magnetic tape cassettes and which includes a conventional capstan drive for moving the magnetic tape past a recording and playback head. A plurality of selection and control levers and knobs 14 are provided on the recorder. In addition, channel selection and tuning knobs 16 are also provided.

An important aspect of the recorder 10 is the switch 18 which has two positions to enable the selection of a 1 hour recording time or a 2 hour recording time. These recording times may be accomplished with the present invention utilizing the same size tape cassette for both speeds. In the 1 hour recording time position, the machine operates at the normal recording speed, while when the switch 18 is in the two hour recording time mode, the machine records at a rate one-half that of the normal recording rate. Operation of the switch 18 is all that is required to change the recording speed modes of the machine, with the exception of some minor tuning of the various controls in certain conditions.

Figure 2:
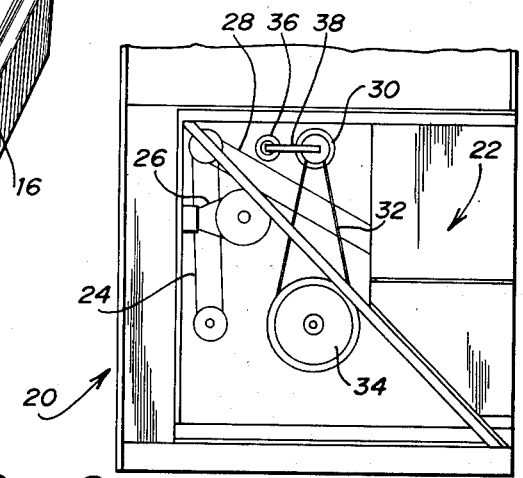
FIG. 2 is a somewhat simplified diagram of the underside of the video cassette recorder shown in FIG. 1 using an alternate embodiment of the present invention.

FIG. 2 illustrates a partially broken away view of the underside of the recorder shown in FIG. 1. The front panel of the recorder is indicated by the numeral 20. Various electronic components for controlling the operation of the device are located on printed circuit boards 22. A large portion of the circuitry and wiring of the unit is omitted in FIG. 2 for clarity of illustration. Various belt drives 24, 26 and 28 are provided to provide various drive functions to the device.

An alternate embodiment of the present invention comprises a pulley assembly 30 which is rotated by a suitable drive motor. The pulley assembly 30 drives a belt 32 which rotates a capstan pulley 34. Pulley 34 rotates to operate the capstan drive which moves the magnetic tape past the recording and playback heads in the conventional manner. The speed at which the capstan pulley 34 rotates determines the speed of movement of the magnetic tape past the recording and playback heads.

A solenoid 36 includes an arm 38 which operates to control the pulley assembly 30 in a manner to be subsequently described in order to enable varying the speed of the belt 32 and thus of the pulley 34.

Figure 3:
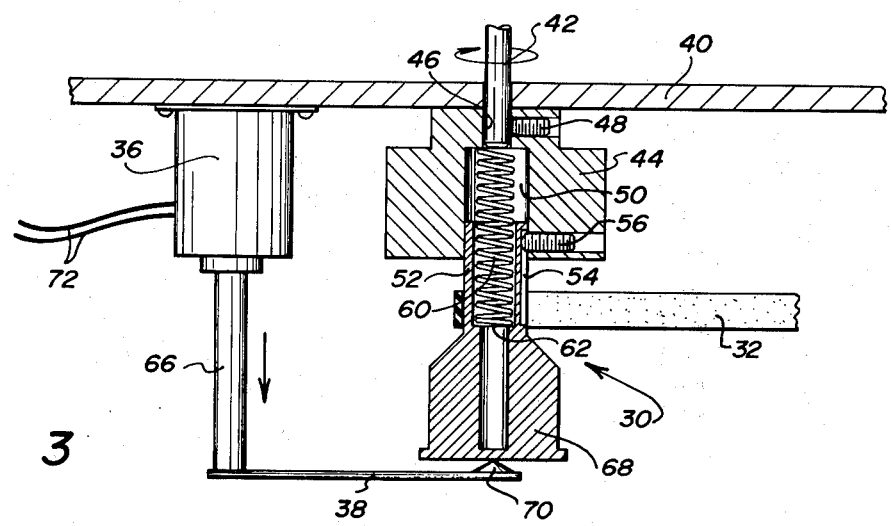
FIG. 3 is a partially sectioned view of an alternate embodiment of the present invention in the slow speed mode.
Figure 4:
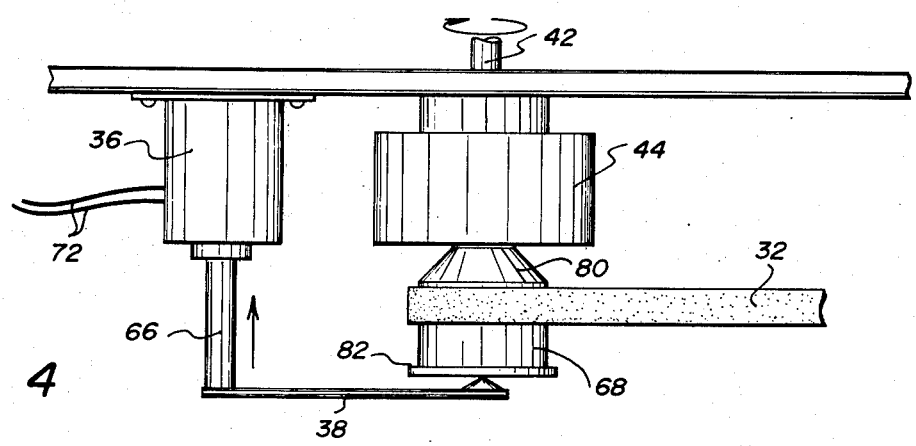
FIG. 4 is a view of an alternate embodiment of the present invention in the fast speed mode.

FIGS. 3 and 4 illustrate in detail the construction and operation of the pulley assembly 30 and of the solenoid 36. The pulley assembly 30 is mounted beneath a plate 40 of the recorder housing. A drive shaft 42 may comprise the conventional drive shaft of the recorder which is rotated by a suitable motor in the known manner. The conventional drive pulley of the recorder is removed, however, and the pulley assembly 30 and solenoid 36 are mounted on the unit in order to provide the advantages of the alternate embodiment of the present invention.

The pulley assembly 30 includes a circular base portion 44 which includes an aperture 46 for receiving the shaft 42. A set screw 48 is threadedly mounted within the base portion 44 and is tightened against the shaft 42 such that the base portion 44 rotates with the shaft 42. A counterbore aperture 50 is formed in the base portion 44 and is dimensioned to receive a circular extension 52. A slot 54 is formed along the length of the extension 52 and a set screw 56 extends from the base portion 44 into the slot 54 in order to key the extension 52 for rotation with the base portion 44. However, the extension 52 is slidable along the aperture 50 relative to the base portion 44.

A spring 60 is disposed within the aperture 50 and extends upwardly into an aperture 62 within the extension 52. Spring 50 thus operates to normally bias the extension 52 in an outwardly extended position. The set screw 56 prevents the extension 52 from being completely withdrawn from the base portion 44.

In the extended position of the pulley assembly 30 shown in FIG. 3, the belt 32 is received by the small diameter extension 52 and the recorder 10 operates at a slow speed to provide a 2 hour recording time mode. The extended position is provided when the solenoid 36 is deenergized and the solenoid shaft 66 is in the outwardly extended position as illustrated. The arm 38 is connected to shaft 66 and extends over the pulley portion 68 of the pulley assembly 30. A flexible tip 70 is mounted on the arm 38 and bears against the bottom surface of the pulley portion 68 in the manner illustrated. Power may be selectively applied to the solenoid 36 via wires 72 which lead to the switch 18. When switch 18 is in the two hour mode, the circuit to wires 72 is broken and no electrical signals are applied to the solenoid 36.

FIG. 4 illustrates the alternate embodiment of the present invention when operating in the one hour recording mode. In this mode, switch 18 is thrown such that electrical power is applied via lead 72 in order to energize solenoid 36. Solenoid shaft 66 is thus retracted. This causes arm 38 to push the extension 52 inside the base portion 44. The pulley portion 68 is then engaged with the belt 32 in order to drive the pulley 34 (FIG. 2) at a higher rate of speed in order to increase the recording speed of the recorder 10 to the normal one hour recording rate.

A tapered portion 80 may be provided between the pulley portion 68 and the extension 52 to enable the belt 32 to be cammed from the extension 52 to the larger diameter pulley 68. A lip 82 is provided on the pulley 68 to prevent belt 32 from slipping off the end of the pulley 68.

When the solenoid 36 is deenergized, the shaft 66 moves to the extended position and the extension 52 moves from the retracted position shown in FIG. 4 to the extended position shown in FIG. 3. The belt 32 then slips from the large diameter pulley 68 onto the smaller diameter extension 52, thereby increasing the recording speed of the device to the two hour mode.

The outer diameter of the pulley 68 corresponds to the diameter of the pulley which is standard on the recorder. The outer diameter of the extension 52 is much smaller than the standard diameter, and thus causes the machine to operate at a much slower speed to provide additional recording time on a standard tape cassette.

Figure 5:
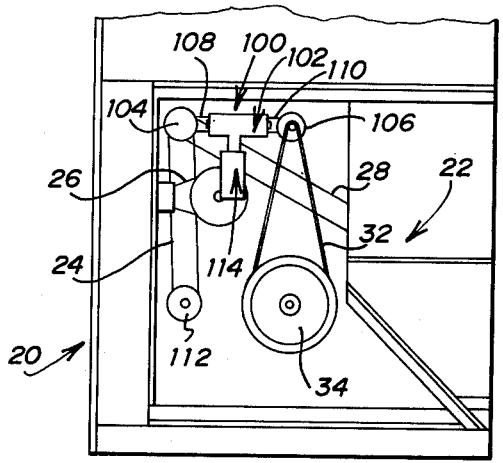
FIG. 5 is a somewhat simplified diagram of the underside of the video cassette recorder shown in FIG. 1 using the preferred embodiment of the present invention.

FIG. 5 illustrates a partially broken away view of the underside of the recorder shown in FIG. 1 and illustrates the preferred embodiment of the invention. FIG. 5 is similar to FIG. 2, with like numerals being used for like and corresponding elements in the two drawings. The front panel of the recorder is indicated by the numeral 20. Various electronic components for controlling the operation of the device are located on the printed circuit boards 22. A large portion of the circuitry and wiring of the unit is omitted in FIG. 5 for clarity of illustration.

The present invention comprises a speed change assembly identified generally by the numeral 100. Speed change assembly 100 includes a housing identified generally by the numeral 102, which is disposed and interconnected between a motor drive transfer pulley 104 and a capstan transfer pulley 106. Motor drive transfer pulley 104 is interconnected to the speed change assembly 100 using a drive belt 108. The capstan transfer pulley 106 is interconnected to the speed change assembly 100 using a drive belt 110. The motor drive transfer pulley 104 is driven by the motor pulley 112 via drive belt 24. The capstan pulley 34 is driven by the capstan transfer pulley 106 via capstan belt 32. The speed change assembly 100 further includes a solenoid identified generally by the numeral 114, the operation of which will be subsequently described. Various other belt drives 26 and 28 are provided to provide various drive functions to the device.

The speed change assembly 100 can be easily mounted to the underside of a conventional single speed recorder. The conventional capstan pulley belt is removed from the motor drive transfer pulley. The assembly 100 is then fixed to the chassis of the recorder in close proximity to the motor drive transfer pulley so that the drive belt 108 can be received by the motor drive transfer pulley 104. The capstan transfer pulley 106 is also mounted to the chassis of the recorder and engages the capstan pulley drive belt 32. The transfer pulley 106 functions to transfer the direction of the output of the speed change assembly 100 to be received by the capstan pulley 34 via the capstan pulley drive belt 32.

Figure 6:
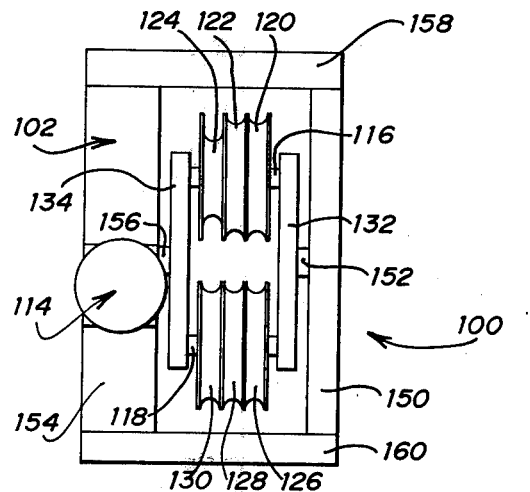
FIG. 6 is a top plan view of the speed change assembly of the present invention with the drive belts removed for clarity of illustration.
Figure 7:
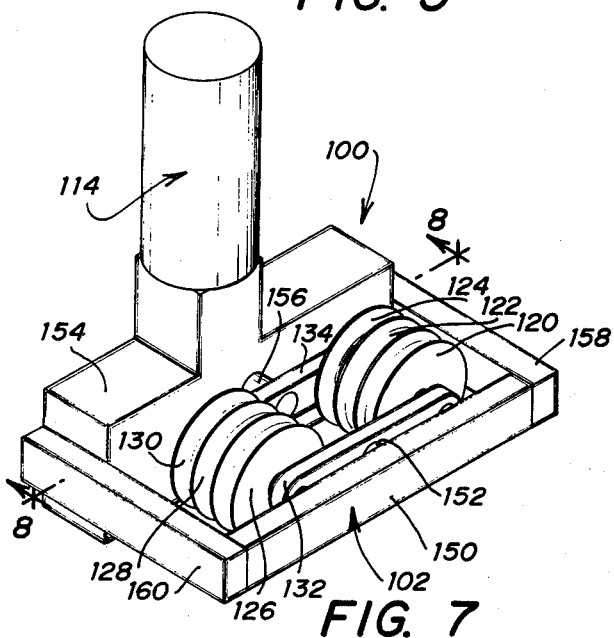
FIG. 7 is a perspective view of the speed change assembly shown in FIG. 6.

Referring simultaneously to FIGS. 6 and 7, the speed change assembly 100 of the present invention is illustrated with the connecting drive belts removed for clarity of illustration. Speed change assembly 100 includes first and second shafts 116 and 118. Mounted to shaft 116 are pulleys 120, 122 and 124. Pulleys 120 and 122 are substantially identical in diameter, while pulley 124 is somewhat smaller in diameter than pulleys 120 and 122. Mounted on shaft 118 are pulleys 126, 128, and 130, which are aligned and parallel to pulleys 120, 122 and 124 of shaft 116. Pulleys 126, 128 and 130 are substantially identical in diameter to pulleys 120 and 122.

Shafts 116 and 118 are interconnected at their ends to parallel plate members 132 and 134. Shafts 116 and 118 are mounted perpendicularly to plate members 132 and 134 to permit the shafts 116 and 118 to freely rotate between plates 132 and 134. Plate 132 is mounted to a housing frame member 150 using a rod 152. Plate member 134 is interconnected to a housing frame member 154 using a rod 156, which extends through member 154.

Housing 102 further includes frame members 158 and 160 which are perpendicularly connected to housing frame members 150 and 154 to provide a rectangular mounting frame for the speed change assembly 100. Frame member 154 is larger in height than housing frame members 150, 158 and 160 to provide adequate clearance for plates 132 and 134 from the chassis of the recorder to permit plates 132 and 134 to be rotated within the area defined by frame members 150, 154, 158 and 160. The rotation of plate members 132 and 134 will cause the position of shafts 116 and 118 and their associated pulleys to interchange, thereby engaging a different set of pulleys with belts 108 and 110. As will subsequently be described, the alternate engagement of pulleys 124 and 130 with belt 108 and pulleys 122 and 128 with belt 110 changes the speed at which the capstan pulley 34 rotates. The speed of the capstan pulley 34 determines the speed of movement of the magnetic tape past the recording and playback heads of the recorder 10 (FIG. 1).

Figure 8:
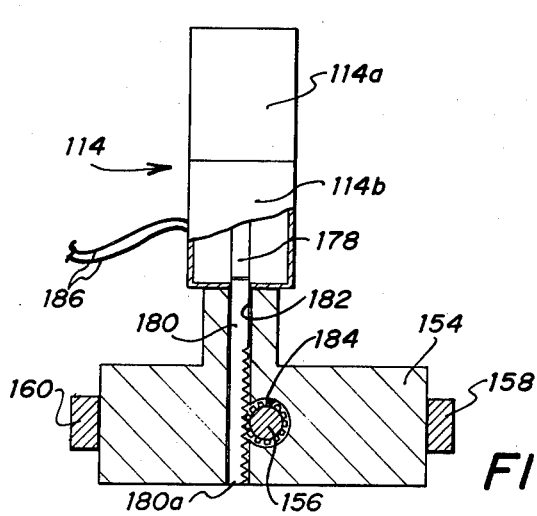
FIG. 8 is a sectional view taken generally along lines 8—8 of FIG. 7.

The rotation of plates 132 and 134 and the resulting interchange of position between shafts 116 and 118 is effected by operation of the solenoid 114. Referring to FIG. 8 solenoid 114 includes solenoids 114a and 114b and an armature 178, which is interconnected to a rack 180. Rack 180 extends through and is positioned within a channel 182 within the housing frame member 154. Rack 180 engages a pinion gear 184, which is mounted to rod 156 extending within frame member 154. Rack 180 and pinion gear 184 operate to transform the rectilinear motion of the solenoid armature 182 into circular motion imparted to the rod 156. The rotation of rod 156 in turn rotates plates 132 and 134 to interchange the position of shafts 116 and 118. Upon energization of solenoid 114b, rack 180 is extended to the position shown in FIG. 8, which places the speed change assembly 100 in the fast mode of operation. Energization of solenoid 114a to retract the rack 180 rotates rod 156 to place the speed change assembly 100 into the slow mode of operation.

Figure 9:
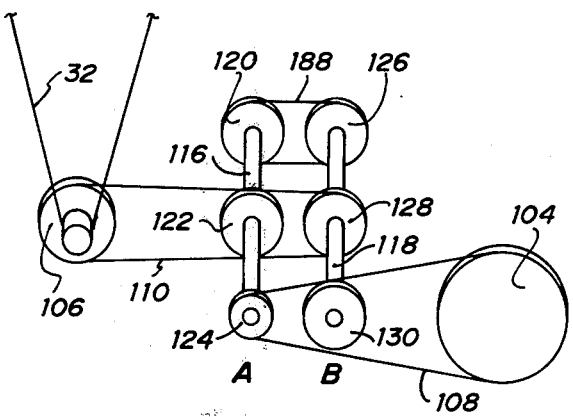
FIG. 9 is a schematic representation of the present invention in the slow speed mode.
Figure 10:
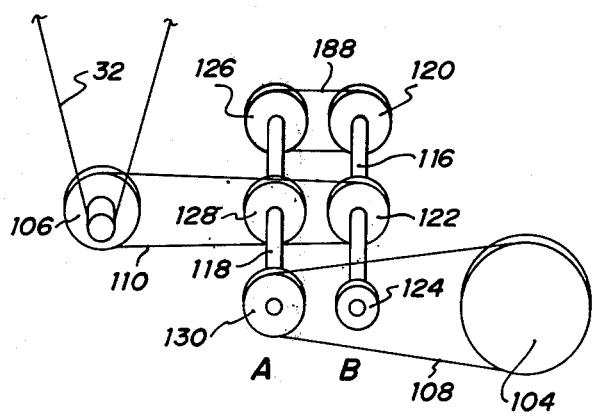
FIG. 10 is a schematic representation of the present invention in the fast speed mode.

The operation of the speed change assembly of the present invention will be described in connection with the schematic illustration of FIGS. 9 and 10. FIG. 9 illustrates the configuration of the present invention when operating in the slow mode of operation, and FIG. 10 illustrates the present invention when operating in the fast recording mode. In the slow mode of operation, switch 18 (FIG. 1) is operated to supply electrical power via lead 186 (FIG. 8) to energize solenoid 114a. The solenoid armature 178 and rack 180 are then retracted to rotate plates 132 and 134 and thereby position the shafts 116 and 118 as shown in FIG. 9. In the slow mode of operation, shaft 116 is positioned in the position identified by A and shaft 118 is located in the position identified by B. In this configuration of the speed change assembly 100, pulley 124 of shaft 116 engages drive belt 108, which is driven by drive transfer pulley 104. Drive transfer pulley 104 is driven by driven pulley 112 via belt 24 (FIG. 5).

The rotational motion imparted to pulley 124 by belt 108 is transferred to the shaft 116, which in turn rotates the pulley 120. Pulley 120 is interconnected to pulley 126 of shaft 118 using an O-ring 188. The speed at which shaft 118 is rotated is therefore the same as the speed of shaft 116, which is determined by the pulley diameter ratios between the drive pulley 112 and pulley 124. Rotation of shaft 118 causes rotation of pulley 128, which in turn drives the belt 110 to rotate the capstan transfer pulley 106. Rotation of the capstan transfer pulley 106 imparts rotational motion to the capstan drive belt 32. Rotation of the capstan drive belt 32 imparts rotational motion to the capstan pulley 34, which determines the speed of movement of the magnetic tape past the recording and playback heads. In the slow mode of operation, pulley 122 of shaft 116 does not engage drive belt 110, and pulley 130 of shaft 118 does not engage drive belt 108.

Referring to FIG. 10, the configuration of the speed change assembly 100 is illustrated in the fast recording time mode. The solenoid armature 178 and interconnected rack 180 are extended when the switch 18 (FIG. 1) is positioned in the fast mode of operation. In this fast recording time mode, the rack 180 is extended as illustrated in FIG. 8. Upon energization of solenoid 114b the rack 180 will impart rectilinear motion to the pinion gear 184, which will in turn rotate shaft 156. Rotation of rod 156 will rotate plates 132 and 134 180° such that the shaft 118 will have been interchanged from position B (FIG. 9) to position A (FIG. 10). Similarly, shaft 116 will have been interchanged from position A (FIG. 9) to position B (FIG. 10). It can now be seen that pulley 130 of shaft 118 engages the drive belt 108, which is driven by the drive transfer pulley 104. Because the pulley ratio between pulley 130 of shaft 118 and the drive transfer pulley 104 is greater than in the slow mode of operation, shaft 118 is rotated at a faster speed.

Shaft 118 rotates pulley 126, which through O-ring 188 rotates pulley 120. Rotation of pulley 120 causes the rotation of shaft 116, which imparts rotation to pulley 122. The rotation of pulley 122 rotates drive belt 110, which causes the rotation of capstan transfer pulley 106. The rotation of capstan transfer pulley 106 imparts rotation to the capstan belt 32 to rotate the capstan pulley 34. It can therefore be seen that in the fast mode of operation, pulley 130 of shaft 118 engages the drive belt 108 and pulley 122 of shaft 116 engages the drive belt 110. Pulley 128 of shaft 118 and pulley 124 of shaft 116 are not engaged by belts 110 and 108 in this mode.

It will thus be seen that the selection of the pulley diameter ratio between pulleys 124 and the drive transfer pulley 104 will determine the speed at which the capstan pulley 34 is rotated in the slow recording time mode. The pulley diameter ratio between pulley 130 and the drive transfer pulley 104 will determine the speed at which the capstan pulley 34 is rotated in the fast recording time mode. The selection of the diameters for pulleys 124 and 130 may be selected for convenient time modes. For example, a two hour recording time in the slow time mode and a one hour recording time in the fast time mode.

The present invention thus provides a device which may be easily installed on conventional magnetic video cassette recorders to increase the flexibility of operation of the recorder to additional recording speeds and recording lengths. Further, a visual indicator can also be provided for the recorder to indicate the particular recording mode of operation.

Whereas the present invention has been described with respect to specific embodiments thereto, it will be understood that various changes and modifications will be suggested to one skilled in the art and it is intended to encompass such changes and modifications which fall within the scope of the appended claims.

What is claimed is:

1. Apparatus for changing the recording speed of a video tape recorder having a drive pulley and a capstan pulley comprising:
   first and second shafts;
   said first shaft including first, second and third pulleys;
   said second shaft including first, second and third pulleys; said first pulley of said first shaft having a larger diameter than said first pulley of said second shaft;
   means for coupling said third pulleys to transfer rotational motion from one of said shafts to the other one of said shafts; and
   means for interchangeably moving said first and second shafts between first and second positions to couple either said first pulley of said first shaft or said first pulley of said second shaft with the drive pulley while coupling either said second pulley of said first shaft or said second pulley of said second shaft with the capstan pulley in order to change the recording speed of the video tape recorder.

2. The apparatus of claim 1 wherein said means for coupling said third pulleys comprises an O-ring.

3. The apparatus of claim 1 wherein said second pulleys have equal diameters.

4. The apparatus of claim 1 wherein said means for interchangeably moving said first and second shafts comprises:
   means for rotating said shafts between said first and second positions.

5. The apparatus of claim 1 wherein said means for interchangeably moving said shafts comprises:
   a solenoid movable between extended and retracted positions and including an armature to move said shafts between said first and second positions, thereby interchanging the position of said shafts.

6. The apparatus of claim 5 wherein said means for interchangeably moving said shafts further comprises:
   a plate member interconnected to said shafts;
   a rack interconnected to said armature of said solenoid for rectilinear motion therewith between said solenoid extended and retracted positions;
   a rod having first and second ends, said first end being interconnected centrally to said plate member; and
   a pinion mounted to said second end of said rod for mating with said rack, thereby deriving circular motion from said rectilinear motion of said rack and imparting said circular motion to said plate for causing rotation of said plate to thereby interchange the position of said shafts.

7. In a video recorder having two recording speeds which includes a capstan pulley for moving video tape past a recording head and a drive pulley rotated at a predetermined drive speed, the combination comprising:
   a housing mounted between said drive pulley and said capstan pulley;
   said housing including first and second shafts;
   said first shaft including first, second and third pulleys;
   said second shaft including first, second and third pulleys,
   said first, second and third pulleys of said second shaft being aligned with said first, second and third pulleys of said first shaft, respectively;
   said first pulley of said first shaft having a larger diameter than said first pulley of said second shaft;
   means for coupling said third pulleys to transfer rotational motion from one of said shafts to the other one of said shafts;
   a first belt for coupling said drive pulley and either one of said first pulleys of said shafts;
   a second belt for coupling said capstan pulley and either one of said second pulleys of said shafts; and
   means for selectively moving said shafts between a first and second position, such that in said first position said first belt couples said drive pulley and said first pulley of said first shaft while said second belt couples said capstan pulley and said second pulley of said second shaft, and in said second position said first belt couples said drive pulley and said first pulley of said second shaft while said second belt couples said capstan pulley and said second pulley of said first shaft.

8. The video recorder of claim 7 wherein said means for coupling said third pulleys comprises an O-ring.

9. The video recorder of claim 7 wherein said means for selectively moving said shafts between said first and second positions comprises:
   a solenoid having an armature movable between retracted and extended positions; and
   means for interconnecting said armature to said housing.

10. The vido recorder of claim 9 wherein said means for interconnecting said armature to said housing comprises:
    a rack interconnected to said armature of said solenoid for rectilinear motion therewith between said extended and retracted positions;
    a rod having first and second ends, said first end being interconnected to said housing; and
    a pinion mounted to said second end of said rod for mating with said rack thereby deriving circular motion from said rectilinear motion of said rack and imparting said circular motion to said housing for causing rotation of said housing to thereby move said shafts between said first and second positions.

11. The video recorder of claim 7 wherein the speed of the recorder is faster in said first position of said shafts than in said second position of said shafts.

12. Speed changing apparatus for connection to a video recorder having belt driven recording tape and two recording speeds comprising:
    a capstan pulley for moving video tape past a recording head;
    a drive pulley rotated at a predetermined drive speed;
    a first shaft having first and second ends and first, second and third pulleys mounted thereon;
    a second shaft having first and second ends and first, second and third pulleys mounted thereon;

said shafts being interconnected by a first plate member mounted perpendicularly to said first ends of said shafts; said shafts being aligned such that said first, second and third pulleys of said first shaft are aligned parallel to said first, second and third pulleys of said second shaft;

said first pulley of said first shaft having a larger diameter than said first pulley of said second shaft;

means for coupling said third pulleys to transfer rotational motion from one of said shafts to the other one of said shafts;

a first belt for coupling said drive pulley and either one of said first pulleys of said shafts;

a second belt for coupling said capstan pulley and either one of said second pulleys of said shafts;

a solenoid for selectively moving said shafts between first and second positions;

said solenoid including an armature movable between a retracted and extended position corresponding with said first and second shaft positions, respectively;

a rack interconnected to said armature for rectilinear motion therewith;

a rod having first and second ends, said first end being interconnected perpendicularly to said plate; and a pinion mounted to said second end of said rod for mating with said rack, thereby deriving circular motion from said rectilinear motion of said rack and imparting said circular motion to said plate to thereby move said shafts between said first and second positions.

13. The speed change apparatus of claim 12 and further including a visual display for displaying the speed of the video recorder.

14. The speed change apparatus of claim 12 and further including:

a second plate mounted perpendicularly to said second end of said first and second shafts and being parallel to said first plate for mounting the speed changing apparatus to the video recorder.

15. The speed change apparatus of claim 12 wherein the speed of the recorder is twice as fast in said first position of said shafts than in said second position of said shafts.

* * * * *